United States Patent [19]
Kingdon

[11] Patent Number: 5,933,468
[45] Date of Patent: Aug. 3, 1999

[54] CONTINUOUS SYNCHRONIZATION ADJUSTMENT IN A TELECOMMUNICATIONS SYSTEM

[75] Inventor: Christopher Hugh Kingdon, Garland, Tex.

[73] Assignee: Telefonaktiebolaget L M Ericsson (publ), Stockholm, Sweden

[21] Appl. No.: 08/813,029

[22] Filed: Mar. 6, 1997

[51] Int. Cl.⁶ .................................................. H04L 7/04
[52] U.S. Cl. .................... 375/362; 370/505; 370/510; 370/514
[58] Field of Search ............................. 375/354, 362, 375/364, 365, 368; 370/503, 505, 506, 509, 510, 512, 514, 520

[56] References Cited

U.S. PATENT DOCUMENTS

| | | | |
|---|---|---|---|
| 4,232,197 | 11/1980 | Acampora et al. | 370/97 |
| 4,592,050 | 5/1986 | Bensadon | 370/103 |
| 5,084,891 | 1/1992 | Ariyavisitakul et al. | 371/42 |

FOREIGN PATENT DOCUMENTS

| | | |
|---|---|---|
| 0 096 854 A2 | 12/1983 | European Pat. Off. . |
| 0 642 242 A2 | 3/1995 | European Pat. Off. . |
| 2206968 | 8/1973 | Germany . |
| 964 901 | 7/1964 | United Kingdom . |
| WO 93/09623 | 5/1993 | WIPO . |
| WO 94/29982 | 12/1994 | WIPO . |

OTHER PUBLICATIONS

Frame Synchronization Failure: Detection and Recovery by Arne Nilsson, Mark Perry and Mike Sutton, 1991 IEEE Transactions on Communications, vol. 39, No. 4, Apr. 1, 1991, New York, pp. 613–618, XP000241269.
EPO Search Report Form 1503, File RS 99163 US, Search Completed Sep. 10, 1997.

*Primary Examiner*—Amanda Le
*Attorney, Agent, or Firm*—Jenkens & Gilchrist, P.C.

[57] ABSTRACT

A continuous synchronization adjustment algorithm is described, which continuously synchronizes frames used in digital synchronous transmissions. By letting the receiver continuously adjust the assumed frame position, rather than adjusting only once per frame as conventionally done, a significant increase in bit error rate can be achieved. When an incorrect single sync bit is detected in a frame, thereafter during the rest of the frame, the single sync bit positions that would result from an advance or delay of the frame position (e.g., due to a bit slip in the frame) are checked. The frame position is then adjusted immediately, without waiting for the beginning of the next frame. Consequently, there is a significant decrease in the number of data bits that are interpreted incorrectly or disregarded. As such, the bit error rate resulting from the present continuous algorithm is significantly improved over that resulting from prior synchronization algorithms.

14 Claims, 4 Drawing Sheets

```
0000 0000 0000 0000
1CCC CCCC CCCC CCCC
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDCC CCCC TTTT
```

FIG. 1
(PRIOR ART)

```
                                      0000 0000 0000 0000
                                      1CCC CCCC CCCC CCCC
                                      1DDD DDDD DDDD DDDD
                                      1DDD DDDD DDDD DDDD
                                      1DDD DDDD DDDD DDDD
                                      1DDD DDDD DDDD DDDD
                                      1DDD DDDD DDDD DDDD
bit slip in this row    →             1DDD DDDD DDDD DD1D
incorrect single sync bit →           0D0D DDDD DDDD DD1D
                                      1D0D DDDD DDDD DD1D
                                      1D1D DDDD DDDD DD1D
incorrect single sync bit →           0D1D DDDD DDDD DD1D
                                      1D0D DDDD DDDD DD1D
incorrect single sync bit →           0D1D DDDD DDDD DD1D
                                      1D0D DDDD DDDD DD1D
                                      1D0D DDDD DDDD DD1D
incorrect single sync bit →           0D1D DDDD DDDD DD1D
incorrect single sync bit →           0D1D DDDD DDDD DD1D
                                      1D0D DDDD DDDD DD1D
                                      1D1D CCCC CCTT TT00
```

FIG. 4

```
0000 0000 0000 0000
1CCC CCCC CCCC CCCC
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDXX
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDDD DDDD DDDD
1DDD DDCC CCCC TTTT
```

*FIG. 5*

CONTINUOUS SYNCHRONIZATION ADJUSTMENT IN A TELECOMMUNICATIONS SYSTEM

BACKGROUND OF THE INVENTION

1. Technical Field of the Invention

The present invention relates in general to the telecommunications field and, in particular, to a method and apparatus for continuously synchronizing transmitted and received symbols in a telecommunications system.

2. Description of Related Art

In a mobile communications system, when transmitting and receiving information carrying symbols, the transmitted and received signals need to be synchronized. For Example, a receiver must know just when in time a particular symbol begins and ends.

Symbols can be of different natures. For example, in a standard 64 kbit/s pulse code modulated (PCM) link, a symbol comprises an 8-bit word, and a user must synchronize transmissions with respect to these 8-bit words. Consequently, every identified symbol can then be interpreted in the same way. However, a symbol can comprise several subsymbols, and in that case, each subsymbol would have to be interpreted in a different way. An example of such a symbol is a Transcoding and Rate Adaptation Unit (TRAU) frame, which is transmitted on the Abis interface in the Global System for Mobile Communications (GSM). With such a complex symbol as a TRAU frame, the relative position of one subsymbol with respect to other subsymbols in the frame has to be determined in order for the subsymbol of interest to be correctly interpreted.

FIG. 1 is a diagram that illustrates a conventional TRAU frame, such as the type used in the GSM. Referring to FIG. 1, assume, for simplicities sake, that each symbol is digital and has a value of "0" or "1", and bit synchronization is perfect. Consequently, it is relatively easy to describe a method for finding the relative position of the subsymbols (e.g., the "D" and "C" bits in the TRAU frame). In FIG. 1, the information-carrying bits (C, D and T) are bounded by a pattern of known bits ("0" and "1"), which are commonly referred to as synchronization bits. The complete set of bits (0, 1, C, D and T) comprise the frame. By searching the received information stream of bits for this known pattern, the position of the frame in time can be determined and, thus, the relative position of each information carrying bit (C, D or T).

As long as the frame pattern remains intact, it is easy to determine the relative position of each subsymbol in the frame. However, due to disturbances that can occur on the transmission path, a bit or pair of bits in the frame can be duplicated or deleted. This phenomenon is referred to as a "bit slip." A method used for searching the received information stream, estimating the relative position of information-carrying symbols, and compensating for bit slip, is referred to as a synchronization algorithm.

In order to better describe the problem, it is useful to assume that the bits shown in FIG. 1 are received serially, with the upper leftmost bit being received first, and the subsequent bits being received in order from left to right and downwards. In this example, it is also useful to assume that bit slips will occur for pairs of bits (i.e., a subsymbol comprises two bits), and only one bit slip will occur per frame.

In a typical synchronization algorithm for a TRAU, the frame position is given by the first 17 bits in the frame. With respect to FIG. 1, these bits (0000 0000 0000 0000 1) are referred to as the "sync header." In order to make an adjustment for a bit slip (as defined directly above), the sync header can move its relative position by being advanced or delayed in time by two bits. Once the frame position has been determined by the 17 bit sync header, the remaining sync bits (referred to as "single sync bits") are each checked to see if they are equal to "1" (i.e., correct). If errors begin to occur in the single sync bits, the next functional section of the receiving device is informed of this error condition, and appropriate error concealment actions can be performed. In the event that the information being carried by the bits in the frame correspond to speech parameters that are to be input to a speech decoder, such an error concealment action would be to discard the current erroneous frame and re-use the prior received frame, possibly together with some amount of muting.

FIG. 2 is a flow diagram of a conventional synchronization algorithm (10), such as the algorithm used for the GSM. A basic problem with the existing synchronization algorithm is that when a bit slip occurs (e.g., step 24), the frame being received is corrupted and remains so until the next frame is received (step 26 and return to step 14). This bit slip can be detected by checking the single sync bits, and a decision can be made to either use the received, corrupted frame or apply some error concealment actions (26). Nevertheless, the problem still remains that certain information bits have been lost. In other words, the frame is corrupted from the point in time where the bit slip occurs (at step 24) until the next sync header is received (step 14). It is only until the next sync header is received that the estimated frame position can then be adjusted and the future effects of the bit slip neutralized.

SUMMARY OF THE INVENTION

It is, therefore, an object of the present invention to detect incorrect single sync bits within a frame so that the frame can be synchronized immediately without waiting for the next frame.

It is also an object of the present invention to decrease the amount of data bits interpreted incorrectly or disregarded due to bit slips.

It is another object of the present invention to decrease the bit error rate resulting from a synchronization algorithm.

It is yet another object of the present invention to continuously synchronize frames.

It is still another object of the present invention to allow a receiver to determine when a received symbol begins and ends.

In accordance with the present invention, the foregoing and other objects are achieved by a continuous synchronization adjustment algorithm that adjusts the synchronization position within the frame in response to bit errors, and does not wait for the beginning of the next frame. When an incorrect single sync bit is detected in a frame, thereafter during the rest of the frame, the single sync bit positions that would result from an advance or delay of the frame position (e.g., due to a bit slip in the frame) are checked. The frame position is then adjusted without waiting for the beginning of the next frame. Consequently, there is a significant decrease in the number of data bits that are interpreted incorrectly or disregarded. As such, the bit error rate (BER) resulting from the present algorithm is significantly improved over the BER resulting from prior synchronization algorithms.

BRIEF DESCRIPTION OF THE DRAWINGS

A more complete understanding of the method and apparatus of the present invention may be had by reference to the following detailed description when taken in conjunction with the accompanying drawings wherein:

FIG. 1 is a diagram that illustrates a conventional TRAU frame;

FIG. 4 is a diagram that illustrates an exemplary TRAU frame with a one bit slip; and FIG. 5 is a diagram that illustrates an exemplary TRAU frame that has been adjusted by the continuous synchronization adjustment algorithm, in accordance with the preferred embodiment of the present invention.

DETAILED DESCRIPTION OF THE DRAWINGS

The preferred embodiment of the present invention and its advantages are best understood by referring to FIGS. 1–5 of the drawings, like numerals being used for like and corresponding parts of the various drawings.

Essentially, the present invention can be used for frame synchronization in a speech codec, for example, to adjust the synchronization position within the frame, without having to wait for the beginning of the next frame. In a preferred embodiment, the present invention can be used as a continuous synchronization and adjustment algorithm in a speech codec located in a base station controller for the GSM. The algorithm can be executed in software under the control of one or more digital signal processors (DSPs), such as, for example, a model C542 DSP manufactured by Texas Instruments Inc. For the preferred embodiment, the algorithm can be executed in an uplink DSP in a GSM base station controller transcoder.

More broadly, the present invention relates to any type of communications system that relies on synchronization between transmitted and received frames, and in which known bits are spread throughout the frames. The known bits are used to determine frame position and adjust the perceived frame position continuously while a frame is being received, and not only at the beginning of the frame.

Specifically, in accordance with the preferred embodiment, when an incorrect (e.g., equal to "0") single sync bit is detected in a frame, in accordance with the invention (continuous synchronization adjustment algorithm), for the rest of the frame, the single sync bit positions that would result from an advance or delay of the frame position (e.g., due to a bit slip in the frame) are checked. The frame position is then adjusted without waiting for the beginning of the next frame. Consequently, there is a significant decrease in the number of data bits that are interpreted incorrectly or disregarded. As such, the BER resulting from the algorithm (and decoder) is significantly improved over the BER resulting from prior algorithms (and decoders).

Figure 2:
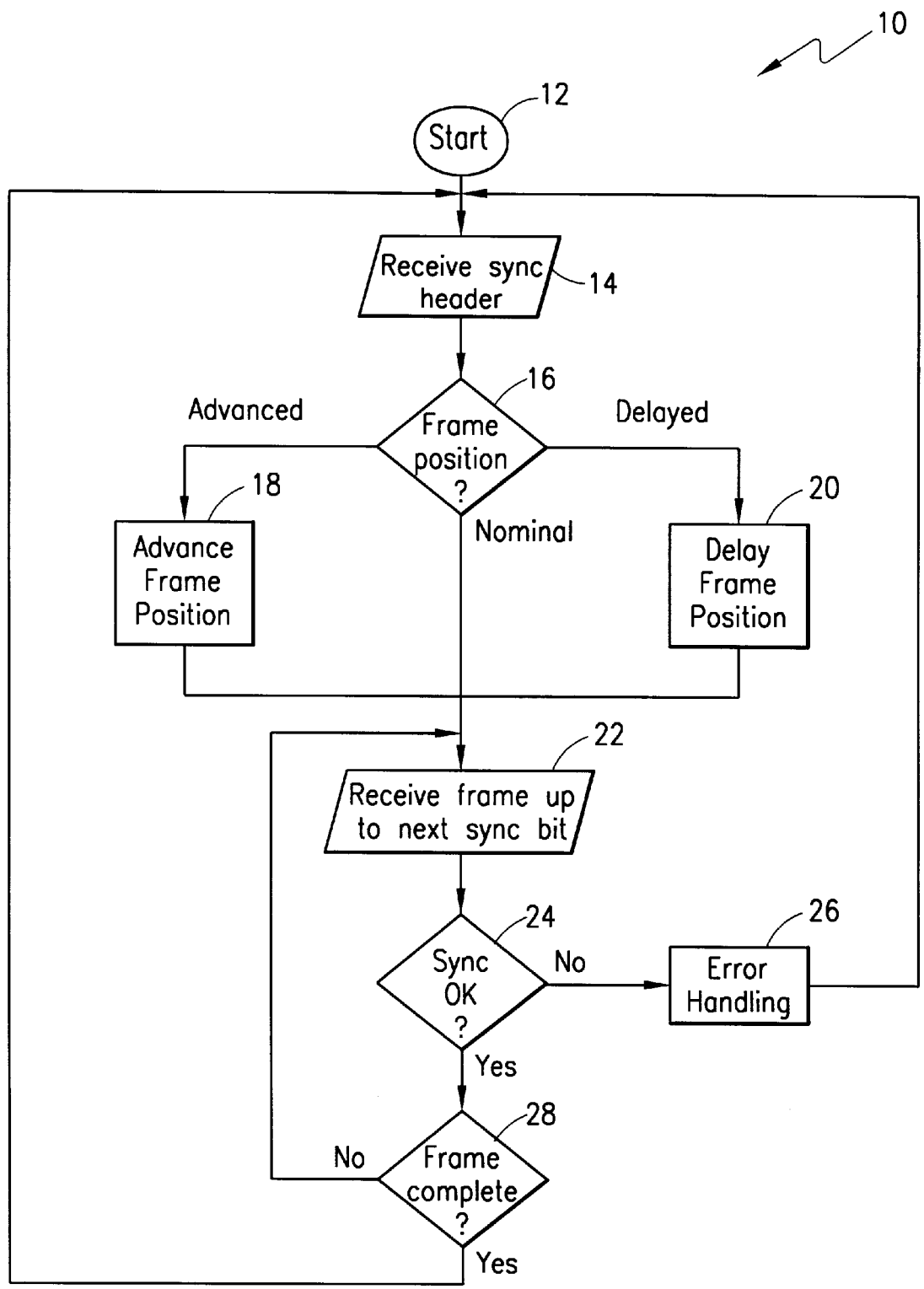
FIG. 2 is a flow diagram of a conventional synchronization algorithm.
Figure 3:
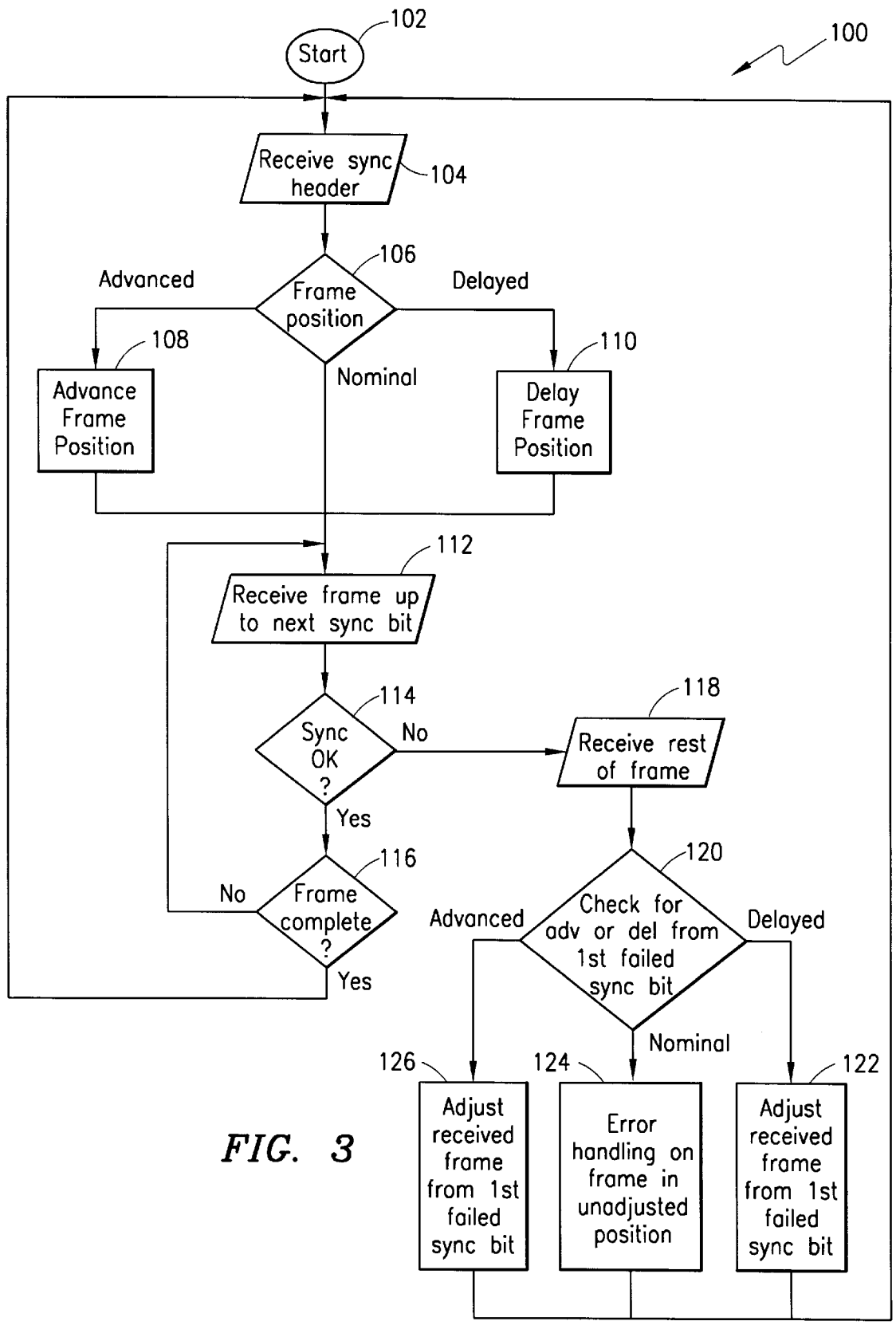
FIG. 3 is a flow diagram that illustrates an exemplary continuous synchronization adjustment algorithm for a decoder, which can be used to implement the method and apparatus of the present invention.

Specifically, FIG. 3 is a flow diagram that illustrates an exemplary continuous synchronization adjustment algorithm, which can be used to implement the method and apparatus of the present invention. Initially, starting at step 104 (similar to the conventional algorithm), the beginning point of the frame is determined by the sync header. In other words, the sync header for the new frame is received (104), and at step 106, the frame position is determined. If the frame position is determined to be delayed in time, it can be advanced accordingly (step 108), or it can be delayed accordingly (step 110) if the frame position is determined to be advanced.

The frame is then received up to the next sync bit (step 112). The frame is accepted as long as the checked single sync bits are correct or equal to "1" (steps 114 and 116) However, at step 114, if a checked single sync bit is incorrect (equal to "0"), at step 118, the continuous synchronization adjustment algorithm continues to receive the rest of the frame. In other words, when the first incorrect single sync bit is detected, the continuous synchronization adjustment portion of the algorithm comes into play.

FIG. 4 is a diagram that illustrates an exemplary TRAU frame with a one bit slip, which is useful to help describe the present invention. Referring to FIGS. 3 and 4, as shown in FIG. 4, about halfway through the frame, a single sync bit has an incorrect value ("0"). This incorrect value can be the result, for example, of a transmission error, a bit value of "1" being read as a "0", or a bit slip wherein a data bit (D) with the value of "0" has taken the position of the single sync bit, as a consequence of two bits being duplicated or skipped. In the example shown in FIG. 4, a pair of data bits (D) were removed.

In accordance with the present invention, when a single sync bit is checked and determined to be erroneous, for the rest of the frame the signal sync bit positions that would result from an advance or a delay of the frame position (e.g., due to a bit slip within the frame) are also checked (step 120). Consequently, for this example, the column in FIG. 4 comprising every bit which is two bits prior to the current nominal single sync bit positions (with respect to the sync header), and the column comprising every bit which is two bits after the current nominal single sync bit positions, as well as the remaining nominal single sync bits, are checked.

As illustrated by FIG. 4, subsequent to the bit slip shown, the column comprising the nominal single sync bit positions contains five erroneous bits (e.g., first column from the left). The column comprising bits which are delayed by two bits, with respect to the current nominal single sync bit positions, contains six erroneous bits (e.g., third column from the left). However, the column comprising all bits which are two bits prior to the current nominal single sync bit positions contains no errors. This column can be found in the second column from the right in FIG. 4, starting at row eight (from the top). All of the bits are equal to "1", which is indeed the case if two bits had been skipped previously in the frame. Notably, the present continuous synchronization adjustment algorithm has thereby allowed detection of the nature and location of a bit slip.

When such a bit slip is detected, the present algorithm adjusts the frame position accordingly (step 122 or 126). In the case of two skipped bits, at step 122, the algorithm inserts two "dummy" bits prior to the first "new" single sync bit in the new position, and then adds subsequently received bits. Such an adjusted frame is shown in FIG. 5.

Referring to the exemplary adjusted frame shown in FIG. 5, the bits denoted by "X" are the dummy bits. Notably, the last two bits in FIG. 4, which were equal to "0", have been replaced by normal "T" bits. These "0" bits were the first two bits of the sync header for the next frame, and they should be treated accordingly while receiving the next frame. In the different case where two bits have been duplicated, the frame position can be adjusted by skipping two bits and advancing the subsequent bits of the frame (e.g., step 126).

In summary, and in accordance with the present invention, the continuous synchronization adjustment algorithm can adjust the assumed synchronization position within the frame, and not only at the beginning of each frame (i.e, prior synchronization algorithms). The present algorithm can also be optimized for each type of frame and transmission channel used. For example, one or more parameters can be added to the present synchronization and adjustment scheme. Two such parameters can be (1) the minimum number of sync bits required for a decision (e.g., "minbits"), and (2) a limit on the relative amount of incorrect single sync bits that will lead to an advance or delay adjustment of the frame (e.g., "berlimit").

For example, for the exemplary TRAU frame described above, the minbits parameter could be set to equal "3" (minbits=3). In other words, the decision to change the sync bit position is based on the detection of at least three incorrect single sync bits. Consequently, no adjustment would be made if the first incorrect single sync bit detected were to be one of the two last single sync bits in the frame.

As another example, the berlimit could be set to equal 0.1 (berlimit=0.1). In other words, the result of the number of incorrect single sync bits detected divided by the number of checked single sync bits from the first identified incorrect single sync bit until the end of the frame, would be less than 0.1. Consequently, the result would be that the nominal sync bit position would be used (e.g., step 124) even, for example, if there were less errors found in a column of single sync bits corresponding to an advance or delay, than in the column corresponding to the nominal bit position, as long as the column corresponding to an advance or delay does not result in a BER lower than 10 percent.

An advantage of using such exemplified parameters is that they can improve performance for a channel which is experiencing other types of bit errors than bit slips. For example, the channel could be experiencing transmission errors that are changing a digital "1" to a "0" and vice versa. As such, the present continuous synchronization adjustment algorithm can thereby be augmented to accommodate a specific frame type or transmission channel.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in synchronizing a sequence of transmitted and received symbols in a telecommunications system, comprising the steps of:
   detecting an incorrect value of a first received symbol from said sequence of received symbols;
   detecting at least one value of a second received symbol and a third received symbol from said sequence of received symbols; and
   synchronizing said sequence of transmitted and received symbols by performing at least one step of advancing said sequence of received symbols if said second received symbol has an incorrect value, and delaying said sequence of received symbols if said third received symbol has an incorrect value.

2. The method of claim 1, wherein said sequence of received symbols comprises a frame.

3. The method of claim 1, wherein said sequence of received symbols comprises a TRAU frame.

4. The method of claim 3, wherein said telecommunications system comprises the GSM.

5. The method of claim 1, wherein said first received symbol comprises a single sync bit in a TRAU frame.

6. The method of claim 1, wherein said incorrect value comprises a logic value of "0".

7. The method of claim 1, wherein said second received symbol comprises a single sync bit position that is delayed in time with respect to said first received symbol.

8. The method of claim 1, wherein said third received symbol comprises a single sync bit position that is earlier in time than said first received symbol.

9. The method of claim 1, wherein said incorrect value of said first received symbol comprises a bit slip.

10. The method of claim 1, wherein said synchronizing step comprises inserting a plurality of dummy symbols in said sequence of symbols.

11. The method of claim 1, wherein said synchronizing step comprises skipping a plurality of symbols.

12. An apparatus for use in synchronizing a sequence of bits in a received frame in a mobile communications system, comprising:
    a digital processor operable to:
       detect an incorrect value of a first received single sync bit position from said sequence of bits in said received frame;
       detect at least one value of a second received single sync bit position and a third received single sync bit position from said sequence of bits in said received frame; and
       synchronize said sequence of received bits in said received frame by at least one of advancing said sequence of bits in said received frame if said second received single sync bit position has an incorrect value, and delaying said sequence of bits in said received frame if said third received single sync bit position has an incorrect value.

13. The apparatus of claim 12, wherein said digital processor comprises a DSP.

14. The apparatus of claim 12, wherein said digital processor comprises an Application Specific Integrated Circuit (ASIC).

* * * * *